United States Patent
Sakurai et al.

(10) Patent No.: US 10,536,663 B2
(45) Date of Patent: Jan. 14, 2020

(54) VIDEO DISPLAY DEVICE, TELEVISION RECEIVER, TRANSMITTING DEVICE, CONTROL PROGRAM, AND RECORDING MEDIUM

(71) Applicant: SHARP KABUSHIKI KAISHA, Sakai, Osaka (JP)

(72) Inventors: Ryoji Sakurai, Sakai (JP); Hideki Suzuki, Sakai (JP); Tomoo Nishigaki, Sakai (JP); Kazuyoshi Yoshiyama, Sakai (JP); Naoaki Shibamoto, Sakai (JP); Yasushi Tetsuka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/079,066

(22) PCT Filed: Jun. 22, 2017

(86) PCT No.: PCT/JP2017/022954
§ 371 (c)(1),
(2) Date: Aug. 22, 2018

(87) PCT Pub. No.: WO2018/003643
PCT Pub. Date: Jan. 4, 2018

(65) Prior Publication Data
US 2019/0052833 A1    Feb. 14, 2019

(30) Foreign Application Priority Data
Jul. 1, 2016    (JP) ................................ 2016-132057

(51) Int. Cl.
H04N 5/57    (2006.01)
H04N 9/64    (2006.01)
(Continued)

(52) U.S. Cl.
CPC ................. H04N 5/57 (2013.01); H04N 5/38 (2013.01); H04N 7/007 (2013.01);
(Continued)

(58) Field of Classification Search
CPC ............ H04N 5/57; H04N 5/38; H04N 7/007; H04N 7/0255; H04N 7/035; H04N 17/004;
(Continued)

(56) References Cited

U.S. PATENT DOCUMENTS

2003/0146919 A1* 8/2003 Kawashima ......... G09G 3/3406
345/609
2007/0024819 A1* 2/2007 Halls ..................... G03B 21/16
353/58
(Continued)

FOREIGN PATENT DOCUMENTS

JP    2008-252761 A    10/2008
JP    2009-027550 A    2/2009
(Continued)

OTHER PUBLICATIONS

Chad Fogg et al., "Content light level information SEI", JCT-VC of ITU-T SG16 WP3 and ISO/IEC JCT 1/SC 29/WG11, Feb. 2015, JCTVC-T0101.

*Primary Examiner* — Sherrie Hsia
(74) *Attorney, Agent, or Firm* — ScienBiziP, P.C.

(57) ABSTRACT

A technology of preventing feeling of a viewer on brightness from significantly changing when content is switched is provided. A video display device (1) includes a calculation unit (23) that calculates video feature relating to a display video, and a mute video display unit that displays a mute video posterior to a first display video, in which luminance of the mute video is luminance corresponding to a value of the video feature relating to the first display video.

15 Claims, 15 Drawing Sheets

FIG. 2

(51) Int. Cl.
  *H04N 7/035*  (2006.01)
  *H04N 17/00*  (2006.01)
  *H04N 5/38*   (2006.01)
  *H04N 7/00*   (2011.01)
  *H04N 7/025*  (2006.01)

(52) U.S. Cl.
  CPC ........... *H04N 7/0255* (2013.01); *H04N 7/035* (2013.01); *H04N 17/004* (2013.01)

(58) Field of Classification Search
  CPC .......... H04N 17/04; H04N 9/64; H04N 5/265; H04N 5/268; H04N 5/272; H04N 9/75
  USPC ....... 348/191, 687, 634, 635, 708, 725, 712, 348/590–592, 598, 728
  See application file for complete search history.

(56) References Cited

U.S. PATENT DOCUMENTS

| | | |
|---|---|---|
| 2017/0085833 A1 | 3/2017 | Toma et al. |
| 2017/0279530 A1 | 9/2017 | Tsukagoshi |

FOREIGN PATENT DOCUMENTS

| | | |
|---|---|---|
| JP | 2014-170179 A | 9/2014 |
| WO | 2015/190045 A1 | 12/2015 |
| WO | 2016/072347 A1 | 5/2016 |

\* cited by examiner

| PROGRAM ① | MUTE VIDEO | PROGRAM ② |
| 200 nit | 0 nit | 300 nit |

(b)

| PROGRAM ① | MUTE VIDEO | PROGRAM ② |
| 200 nit | 200 nit | 300 nit |

(c)

| PROGRAM ① | MUTE VIDEO | PROGRAM ② |
| 400 nit | 0 nit | 100 nit |

(d)

| PROGRAM ① | MUTE VIDEO | PROGRAM ② |
| 400 nit | 400 nit | 100 nit |

FIG. 6

```
CalculateMaxFALL()
{
    set MaxFALL = 0
    for each ( frame in the sequence )
    {
        set runningSum = 0
        for each ( pixel in the active image area of the frame )
        {
            convert the pixel's non-linear (R',G',B') values to linear values (R,G,B) calibrated to cd/m²
            set maxRGB = max(R,G,B)
            set runningSum = runningSum + maxRGB
        }
        set frameAverageLightLevel = runningSum / numberOfPixelsInActiveImageArea
        if( frameAverageLightLevel > MaxFALL )
            set MaxFALL = frameAverageLightLevel
    }
    return MaxFALL
}
```

FIG. 7-1

```
CalculateCPL()
{
    set CPL = 0
    set BkFrame = WtFrame = 0
    set BkFrameAL = WtFrameAL = 0 for each ( frame in the sequence )
    {
        set runningSum = 0
        for each ( pixel in the active image area of the frame )
        {
            calculate the pixel's linear luminance value Y
            set runningSum = runningSum + Y
        }
        set frameAverageLuminance = runningSum / numberOfPixelsInActiveImageArea if( flameAverageLuminance < Bk)
        {
            if ( BkFrame = 0 ) { set BkFrame = BkFrame + 1; set BkFrameAL = frameAverageLuminance }
            else { set BkFrame = BkFrame + 1; set BkFrameAL = BkFrameAL + frameAverageLuminance }
        }
        else if(flameAverageLuminance > Wt)
        {
            if ( WtFrame = 0 ) { set WtFrame = WtFrame + 1; set WtFrameAL = frameAverageLuminance }
            else { set WtFrame = WtFrame + 1; set WtFrameAL = WtFrameAL + frameAverageLuminance }
        }
```

```
CalculateY(Rin, Gin, Bin)
{
    set R = EOTF(Rin)
    set G = EOTF(Gin)
    set B = EOTF(Bin)
    return Y = 0.2627R + 0.6780G + 0.0593B
}
```

FIG. 7-2

```
    else
    {
        if( BkFrame >0 ) {
            calculate average frame luminance value (AFL) from BkFrame & BkFrameAL
            set CPL = average(CPL, AFL)
            set BkFrame = BkFrameAL = 0
        } else if( WtFrame > 0 ) {
            calculate average frame luminance value (AFL) from WtFrame & WtFrameAL
            set CPL = average(CPL, AFL)
            set WtFrame = WtFrameAL = 0
        } else {
            set CPL = average(CPL, frameAverageLuminance )
        }
    }
    return CPL
}
```

FIG. 12

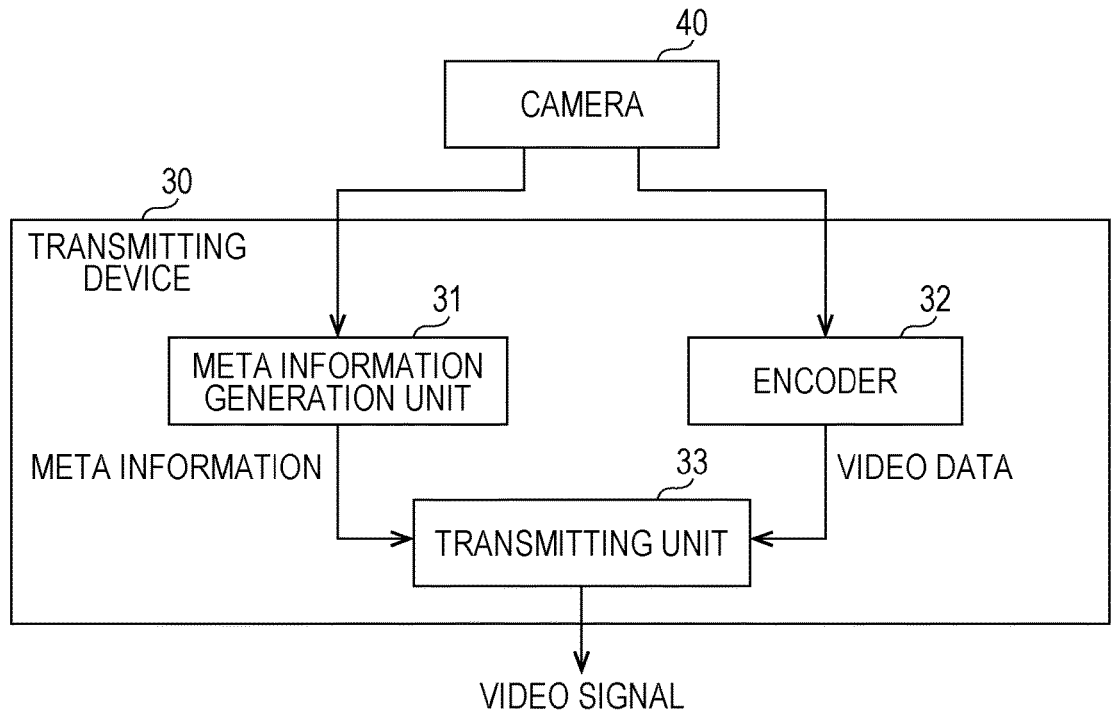

FIG. 13

| DATA STRUCTURE | NUMBER OF BITS | CONTENT |
|---|---|---|
| Video_Component_Descriptor(){ | | |
|   descriptor_tag | 16 | DESCRIPTOR TAG, 0x8010: VIDEO COMPONENT DESCRIPTOR |
|   descriptor_length | 16 | DESCRIPTOR LENGTH, SIZE OF REGION OF PRESENT DESCRIPTOR |
|   video_resolution | 4 | VIDEO SIGNAL RESOLUTION |
|   video_aspect_ratio | 4 | VIDEO SIGNAL ASPECT RATIO |
|   video_scan_flag | 1 | VIDEO SCAN FLAG |
|   reserved | 2 | #UNUSED |
|   video_frame_rate | 5 | VIDEO SIGNAL FRAME RATE |
|   component_tag | 16 | COMPONENT TAG |
|   ISO_639_language_code | 24 | LANGUAGE CODE |
|   for (i=0; i<N; i++){ | | |
|     text_char | 8 | COMPONENT DESCRIPTION |
|   } | | |
| } | | |

| table_id | 8 |
| section_syntax_indicator | 1 |
| '0' | 1 |
| reserved | 2 |
| section_length | 12 |
| service_id | 16 |
| reserved | 2 |
| version_number | 5 |
| current_next_indicator | 1 |
| section_number | 8 |
| last_section_number | 8 |
| transport_stream_id | 16 |
| original_network_id | 16 |
| segment_last_section_number | 8 |
| last_table_id | 8 |
| for (i=0;i<N;i++) { | |
|    event_id | 16 |
|    start_time | 40 |
|    duration | 24 |
|    running_status | 3 |
|    free_CA_mode | 1 |
|    descriptors_loop_length | 12 |

D1 → for (j = 0;j< M;j++) {
    descriptor()
}

}
CRC_32

(b)

| descriptor_tag | 0x4E |
| descriptor_length | |
| descriptor_number | |
| last_descriptor_number | |
| : | |
| : | |
| : | |
| text_length | |
| Text_char | SENSE LUMINANCE 200 nit |

(c) PROGRAM GUIDE (EPG)

PROGRAM NAME
TIME
PLAYER
CONTENT

SENSE LUMINANCE 200 nit ← E1

VIDEO DISPLAY DEVICE, TELEVISION RECEIVER, TRANSMITTING DEVICE, CONTROL PROGRAM, AND RECORDING MEDIUM

TECHNICAL FIELD

The present invention relates to a video display device, a television receiver, a transmitting device, a control program, and a recording medium.

BACKGROUND ART

In a technology related to voice, there is a known technology of equalizing feeling of a viewer on a magnitude of a sound for each content by using loudness which is the magnitude of the sound perceived by a person. In addition, in a technology related to video, high luminance such as HDR can be displayed, and opportunity is increasing in which the feeling of the viewer on brightness is significantly changed for each content.

CITATION LIST

Patent Literature

PTL 1: Japanese Unexamined Patent Application Publication No. 2009-27550 (published on Feb. 5, 2009)

SUMMARY OF INVENTION

Technical Problem

If feeling of a viewer on brightness is significantly changed for each content, a psychological burden of the viewer may be increased in some cases. For example, a black screen is usually displayed at the time of channel switching or content switching at timing when video cannot be displayed. However, since HDR has a large variation width of luminance, compared with SDR, in a case where luminance of the content before switching is high, if the black screen is displayed, a luminance difference is large and the viewer sometimes feels uncomfortable.

The present invention provides a technology to prevent feeling of a viewer on brightness from changing significantly when content is switched.

Solution to Problem

In order to solve the above problems, a video processing device according to an aspect of the present invention includes a calculation unit that calculates video feature of a video signal, and a mute video generation unit that generates a mute video inserted into a display video of the video signal, in which the mute video generation unit sets luminance of the mute video to a value corresponding to the video feature of the video signal displayed prior to the mute video in time.

Advantageous Effects of Invention

According to one embodiment of the present invention, feeling of a viewer on brightness is not significantly changed at the time of content switching, and unnecessary psychological burden of the viewer can be reduced.

BRIEF DESCRIPTION OF DRAWINGS

FIG. 4 is a diagram illustrating changes of luminance values of a mute video, (a) and (c) of FIG. 4 illustrate the luminance values in a display device in the related art, and (b) and (d) of FIG. 4 illustrate the luminance values of the display device according to Embodiment 1 of the present invention.

FIG. 6 is an example of a pseudo code for calculating MaxFALL.

FIG. 7-1 is an example of a pseudo code for calculating a sense luminance value in Embodiment 1 of the present invention.

FIG. 7-2 is an example of the pseudo code for calculating the sense luminance value in Embodiment 1 of the present invention.

FIG. 12 is a block diagram illustrating a configuration of a transmitting device according to Embodiments 3, 4, 5, 6, and 7 of the present invention.

FIG. 13 is a diagram illustrating an example of Video_Component_Desciptor that is generated by a meta information generation unit.

FIG. 17 is a diagram illustrating an example of an EIT generated by the meta information generation unit. (a) of FIG. 17 is a diagram illustrating an example of the EIT, (b) of FIG. 17 is a diagram illustrating another example of a descriptor D1 illustrated in (a) of FIG. 17, and (c) of FIG. 17 is a diagram illustrating an example of an electronic program guide (EPG).

DESCRIPTION OF EMBODIMENTS

Hereinafter, embodiments of the present invention will be described in detail. However, a configuration described in the present embodiment is not intended to limit the scope of the present invention to that only as long as there is no specific description in particular, and is merely an explanatory example.

A video processing device according to each embodiment of the present invention includes a calculation unit that calculates video feature of a video signal and a mute video generation unit that generates a mute video to be inserted into a display video indicated by the video signal, and the mute video generation unit sets luminance of a mute video so as to be a value corresponding to the video feature of the video signal representing the display video displayed prior to the mute video in time.

Here, the video feature is an index indicating sense brightness of the video. A sense luminance value or the like can be used as an example of the video feature. The sense luminance value is an index calculated from a luminance value of the video signal. An average luminance value, a maximum luminance value, a median value of a luminance value histogram, Maximum Frame Average Light Level (MaxFALL), a combination thereof, and the like can be used as an example of the sense luminance values. The video feature includes not only an index calculated from the luminance value of the video signal like the sense luminance value but also an index calculated from chromaticity of the video signal.

In the present specification, a "mute video" indicates video data inserted into a display video, or an image represented by the video data, at timing of switching between two different contents, switching of scenes in the content, or the like.

Embodiment 1

(Display Device)

Figure 1:
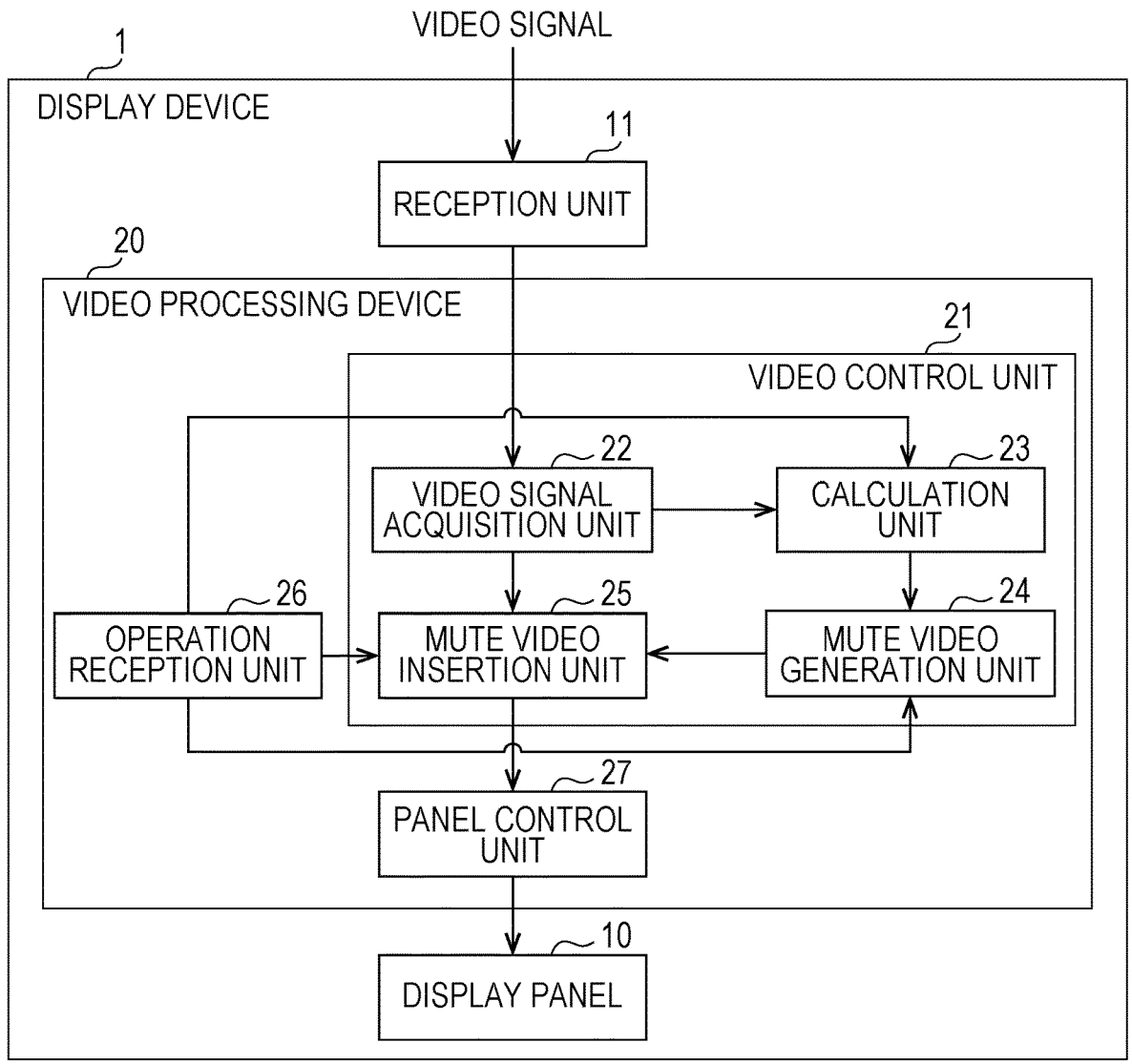
FIG. 1 is a block diagram illustrating a configuration of a display device according to Embodiments 2, and 6 of the present invention.
Figure 2:
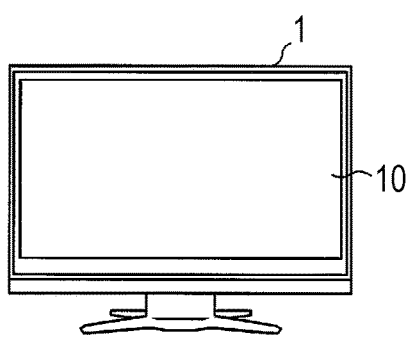
FIG. 2 is a diagram illustrating an appearance of a television receiver according to an embodiment of the present invention.

A display device 1 including a video processing device 20 according to Embodiment 1 will be described with reference to FIGS. 1 and 2. FIG. 1 is a block diagram illustrating a configuration of the display device 1 including the video processing device 20 according to the present embodiment. FIG. 2 is a front view illustrating an appearance of the display device 1. As illustrated in FIG. 1, the display device 1 includes a display panel 10, a reception unit 11, and the video processing device 20. In addition, the display device 1 may be configured to include a tuner and may be realized as a television receiver. The display device may be referred to as a video display device.

(Video Processing Device)

The video processing device 20 is a device for sequentially outputting a plurality of frames configuring a video by decoding a video signal received by the reception unit 11 and includes a video control unit 21, an operation reception unit 26, and a panel control unit 27.

Here, a video signal received by the reception unit 11 can be an HDR signal such as an HDMI signal based on an High-Definition Multimedia Interface (HDMI) (registered trademark) standard, a Tuner signal (a signal received by a tuner), or a CVBS Composite Video, Blanking, and Sync: composite video signal) signal.

(Video Control Unit)

The video control unit 21 includes a video signal acquisition unit (acquisition unit) 22, a calculation unit 23, a mute video generation unit 24, and a mute video insertion unit 25.

The acquisition unit 22 acquires the video signal received by the reception unit 11. The acquisition unit 22 outputs video data included in the video signal among the acquired video signals to the mute video insertion unit 25 and the calculation unit 23.

The calculation unit 23 calculates the video feature is each content (program and CM) included in the video data with reference to the input video data. In other words, the calculation unit 23 calculates the video feature relating to a displayed video. A calculation example of the video feature will be described below.

The calculation unit 23 calculates second average luminance values which are average luminance values for each frame in a plurality of frames included in the video signal acquired by the acquisition unit 22, calculates a first average luminance value by averaging the second luminance values in the plurality of frames, and may use the first average luminance value as the video feature. When calculating the second average luminance values, the calculation unit 23 may calculate the second average luminance values in an active image area excluding luminance values equal to or larger than a predetermined value as will be described below.

The calculation unit 23 outputs the calculated video feature to the mute video generation unit 24. A specific description on the video feature will be described below.

The mute video generation unit 24 sets a luminance value of a mute video so as to have a value corresponding to the input video feature and generates a mute video having the luminance value. When an operation of stopping a display video is received by the operation reception unit 26, the mute video generation unit 24 sets the luminance value of the mute video so as to have a value corresponding to the video feature of the stopped display video, and generates a mute video having the luminance value. For example, the mute video generation unit 24 sets the luminance of the mute video such that a difference between (1) the luminance of the mute video, and (2) a sense luminance value of the video data representing a display video displayed prior to the mute video in time.

Here, "prior to the mute video in time" is, for example, immediately before the mute video.

In the present specification, the "display video displayed prior to the mute video in time" is also referred to as a "first display video". Here, "posterior to the first display video" means, for example, shortly after the first display video, but it is not limited thereto. In addition, the "display video displayed posterior to the mute video" is also referred to as a "second display video". In addition, the expression "display video" used without "first" and "second" is used to include at least one of the first display video and the second display video which are described above.

In addition, "so as to be within a predetermined range" also includes a case where a luminance value of the mute video=a sense luminance value of the video data, and also includes case where it is represented as |luminance value of mute video−sense luminance value|/sense luminance value≤A (for example, A=0.1) (here, a notation |X| represents an absolute value of X). In addition, a predetermined range of the video data can be set appropriately. In addition, the predetermined range also includes a variation of a value due to a calculation error caused by rounding or the like.

The mute video generation unit 24 outputs the generated mute video to the mute video insertion unit 25.

The mute video insertion unit 25 inserts the mute video into the video data by using the video data input from the acquisition unit 22 and the mute video input from the mute video generation unit 24. A temporal position on the video data into which the mute video is inserted may be, for example, between two different contents, may be timing of scene switching in a certain content, or may be another timing. When receiving an operation to stop the display video from the operation reception unit 26, the mute video insertion unit 25 inserts the mute video posterior to the stopped video. In addition, the mute video insertion unit 25 outputs the video data into which the mute video is inserted to the panel control unit 27.

(Other Members)

The operation reception unit 26 receives an operation performed by a user. There are an operation of starting display of a video, an operation of stopping the display of the video, and the like as an example of operations received by the operation reception unit 26.

The panel control unit 27 can display the video data on the display panel 10 with an appropriate luminance by tone-mapping the video data input from the mute video insertion unit 25. The tone mapping is to determine how much luminance that can be expressed on the display panel 10 can be assigned to luminance information included in a video signal.

The display panel 10 may be realized by any device as long as it is a display device capable of displaying a video, but a specific example thereof includes a liquid crystal display, an organic Electro Luminescence (EL) display, a plasma display or the like.

The display panel 10 and the panel control unit 27 are also collectively referred to as a display unit. Since the display unit displays the display video into which the mute video is inserted in the mute video insertion unit 25, the display unit may be referred to as a mute video display unit.

(Mute Video Generation Processing)

Figure 3:
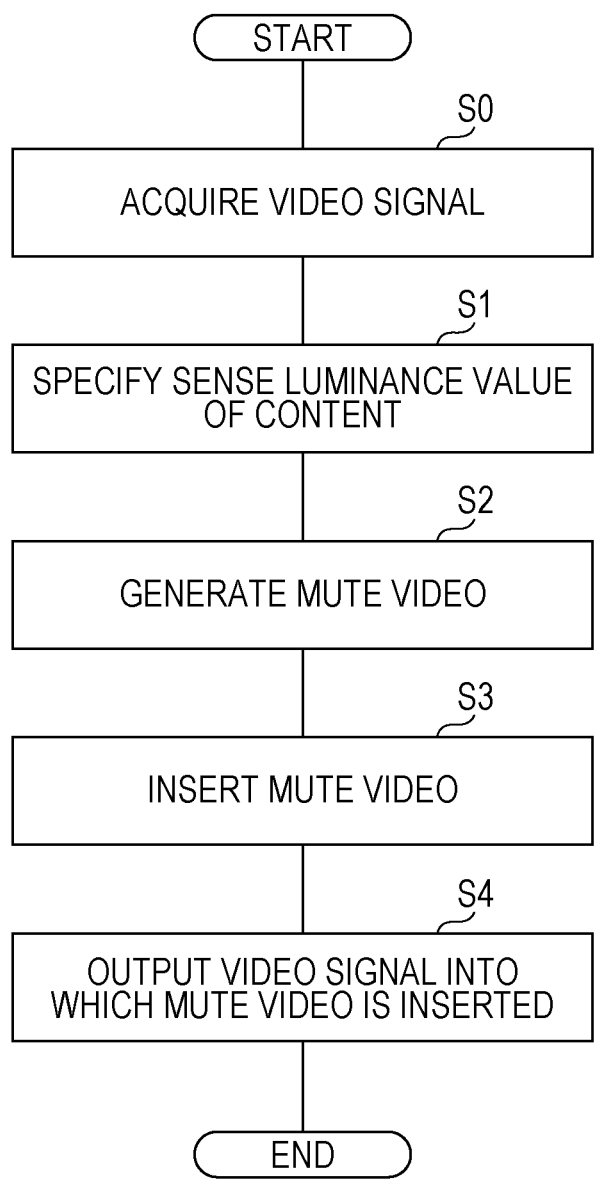
FIG. 3 is a flowchart illustrating a mute video generation method according to Embodiment 1 of the present invention.

A flow of mute video generation processing performed by the video processing device 20 according to the present embodiment will be described with reference to FIG. 3. FIG. 3 is a flowchart illustrating the flow of the mute video generation processing.

The video processing device 20 according to the present embodiment generates a mute video in which a luminance value is set by performing steps S0 to S4 which will be described below.

First, the acquisition unit 22 acquires a video signal (step S0). The acquisition unit 22 outputs video data of the acquired video signal to the mute video insertion unit 25 and the calculation unit 23.

Next, the calculation unit 23 specifies video feature corresponding to each content included in the video data, from the video data input from the acquisition unit 22 (step S1).

Next, the mute video generation unit 24 acquires the video feature from the calculation unit 23, sets a luminance value of the mute video so as to have a value corresponding to the acquired video feature, and generates the mute video having the luminance value (step S2). In addition, in step S2, when receiving an operation of stopping the display video from the operation reception unit 26, the mute video generation unit 24 sets the luminance value of the mute video so as to have a value corresponding to the video feature of the stopped display video, and generates a mute video having the luminance value.

Next, the mute video insertion unit 25 inserts the mute video into the video data by using the video data input from the acquisition unit 22 and the mute video input from the mute image generation unit 24 (step S3).

Next, the panel control unit 27 can display the video data on the display panel 10 with an appropriate luminance by tone-mapping the video data input from the mute video insertion unit 25. Thereby, the video data is displayed on the display panel 10 (step S4).

As described above, in the mute video generation processing according to the present embodiment, a value of the luminance value of the mute video becomes a value corresponding to a sense luminance value of the video data displayed prior to the mute video in time, and thus, it is possible to reduce a difference in luminance value between the mute video and the video data displayed prior to the mute video in time and to reduce a psychological burden of a user due to a luminance difference.

Next, an example of the mute video generation processing in which the luminance value according to the present embodiment is set will be described more specifically with reference to FIGS. 4 and 5.

In (a) and (c) of FIG. 4, the luminance value of the mute video is 0 nit, and a difference in luminance value between the mute video and the content prior to and posterior to the mute video is large. As illustrated in (b) and (d) of FIG. 4, the mute video generation unit 24 sets the luminance value of the mute video such that a difference in luminance value between the mute video and the content displayed prior to the mute video in time is within a predetermined range. As a result, as illustrated in (b) and (d) of FIG. 4, the difference in luminance value between the mute video at the time of content switching and the content prior to and posterior to the mute video is reduced compared with (a) and (c) of FIG. 4.

Figure 5:
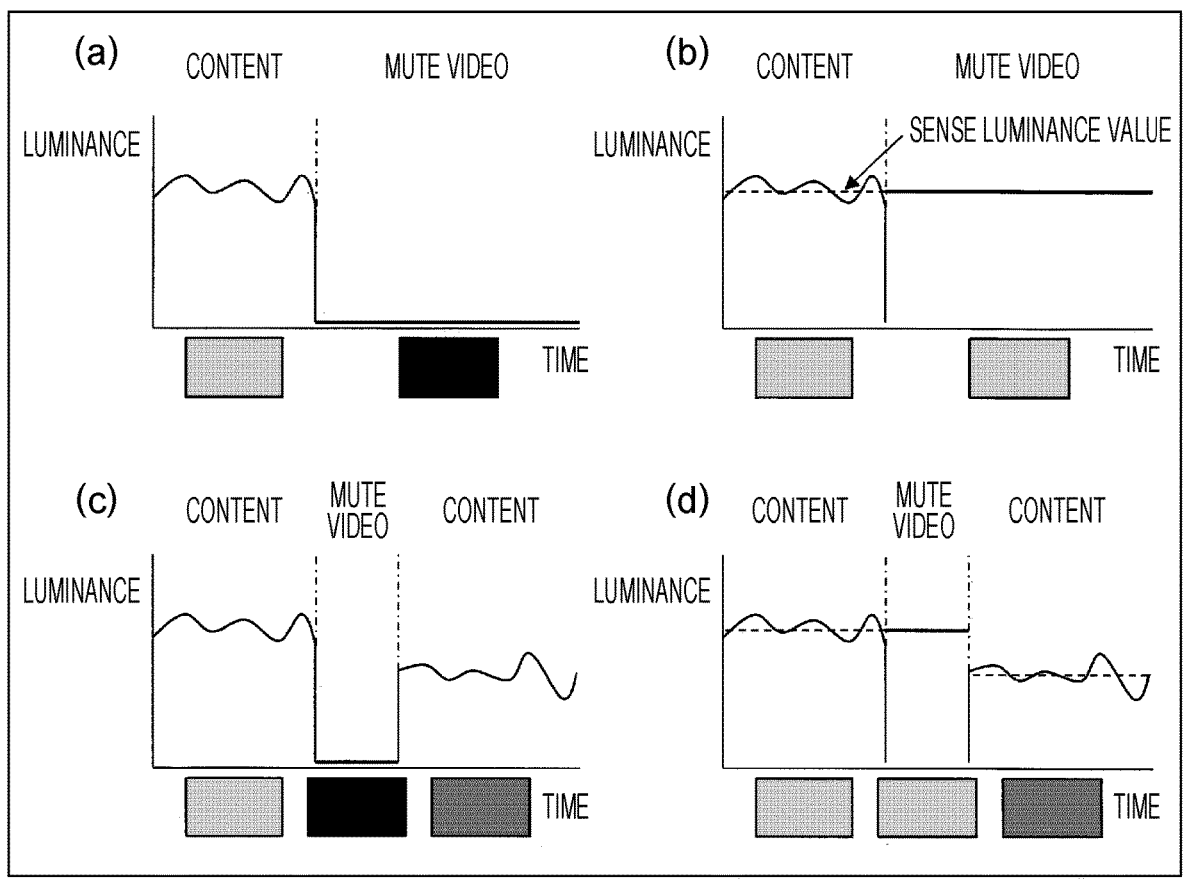
FIG. 5 is a graph illustrating a time-dependent change in a luminance value of a display video, (a) and (b) of FIG. 5 illustrate a time-dependent change in luminance value in a case where there is no next content, and (c) and (d) of FIG. 5 illustrated a time-dependent change in luminance value in a case where there is the next content.

FIG. 5 illustrates a time-dependent change in luminance value of the display video (content and mute video). (a) and (c) of FIG. 5 illustrate a time-dependent change in luminance value of a video processing device in the related art, (a) of FIG. 5 illustrates a case where the display video is stopped, and (c) of FIG. 5 illustrates a case where the mute video is inserted between the respective contents. (b) and (d) of FIG. 5 illustrate a time-dependent change in luminance value of a video processing device according to the present embodiment, (b) of FIG. 5 illustrates a case where the display video is stopped, and (d) of FIG. 5 illustrates a case where the mute video is inserted between the respective contents. As illustrated in (a) and (c) of FIG. 5, in the video processing device in the related art, a difference in luminance value between the mute video and the content prior to and posterior to the mute video is large. Meanwhile, as illustrated in (b) and (d) of FIG. 5, in the video processing device 20 according to the present embodiment, the mute image generation unit 24 sets the luminance value of the mute video such that a difference between
(1-1) luminance of the mute video, and
(1-2) a sense luminance value of video data representing the display video (first display video) displayed prior to the mute video in time.

As a result, in (b) and (d) of FIG. 5, the difference in luminance value between the mute video and the content prior to and posterior to the mute video is reduced compared with (a) and (c) of FIG. 5.

As described above, in the video processing device 20 according to the present embodiment, the luminance value of the mute video becomes a value within a predetermined range with respect to the sense luminance value of the video data displayed prior to the mute video in time, and thus, it is possible to reduce the difference in luminance value between the mute video and the video data displayed prior to the mute video, and to reduce a psychological burden of a user due to a luminance difference.

(Calculation Example of Video Feature)

Hereinafter, a calculation example of video feature calculated by the calculation unit 23 will be described with reference to FIGS. 6 and 7.

In the present specification, the video feature means a feature relating to brightness of a target video. A sense luminance value (CPL: Contents Perceptual Luminance) which will be specifically described below can be used as an example of the video feature. The following description is merely a calculation example of the sense luminance value, and it is not intended to limit description of the present specification thereby.

Example 1: Calculation Method Using MaxFALL

In the present example, the calculation unit 23 calculates a maximum frame average luminance Maximum Frame Average Light Level (MaxFALL) from the acquired video data, and sets the calculated MaxFALL as a sense luminance value. Here, MaxFALL is a maximum value of an average luminance among all the frames configuring a video, and an algorithm is specified by CEA861.3. FIG. 6 illustrates a pseudo code for calculating MaxFALL.

As illustrated in FIG. 6, the calculation unit 23 converts (R', G', and B') which is a nonlinear pixel value into (R, G, and B) which is a linear luminance value that uses $cd/m^2$ (candela per square meter) as a unit, for each pixel included in an active image area (active image area) in a certain frame. Then, a maximum value of (R, G, and B) is set as a maximum luminance value maxRGB of a relevant pixel.

Then, the calculation unit 23 sets an average of the maximum luminance values maxRGB of all pixels included in the active image area as an average luminance flameAverageLightLevel in a relevant frame.

Furthermore, the calculation unit 23 sets the maximum average luminance flame AverageLightLevel among all the frames included in a video sequence as MaxFALL, and sets the MaxFALL as a sense luminance value of the target video.

For example, as will be described below, the active image area indicates an area obtained by excluding an area of a predetermined luminance value or more from the target frame, but is not limited thereto, and can also be set appropriately.

Example 2: Method of Excluding Black Screen and White Screen

In a case where a frame having a white screen (a screen having an average luminance greater than or equal to a threshold value Wt (Bk<Wt)) is included among all the frames included in the video sequence, a value of MaxFALL becomes a significantly large value, and thereby, the video feature calculated by the calculation unit 23 may not be suitable as a feature of the entire video sequence.

In the present example, the calculation unit 23 calculates a sense luminance value by excluding at least one of a black screen (a screen having an average luminance less than or equal to a threshold value Bk) and a white screen (a screen having an average luminance greater than or equal to the threshold value Wt (Bk<Wt.)). More preferable sense luminance value can be calculated by using the present example for calculating the sense luminance value.

FIG. 7 illustrates a pseudo code for the calculation unit 23 to calculate the sense luminance value according to the present example. As illustrated in FIG. 7, the calculation unit 23 calculates a linear luminance value Y of the relevant pixel, for each pixel included in the active image area in a certain frame included in the acquired video data. Calculation of the linear luminance value Y is performed by the pseudo code illustrated within a dotted frame in FIG. 7. More specifically, the calculation unit 23 applies an Electro-Optical Transfer Function (EOTF) conversion to pixel values (Rin, Gin, and Bin) relating to each color of red, green, and blue in the pixel, thereby, calculating luminance values (R, G, and B) for each color of red, green, and blue, and furthermore, calculates the luminance value Y with reference to all of the luminance values (F, G, and B) relating to each color. More specifically, the luminance value Y is calculated by $$Y=0.2627R+0.6780G+0.0593B.$$

Then, the calculation unit 23 calculates a sense luminance value of a target video with reference to the luminance value Y of each pixel included in each frame in the video data.

More specifically, as illustrated in FIG. 7, the calculation unit 23 sets an average of the luminance values Y of all the pixels included in the active image area as an average luminance flameAverageluminance in the relevant frame.

Furthermore, as illustrated in FIG. 7, the calculation unit 23 excludes at least one of a black screen (a screen having an average luminance less than or equal to the threshold value Bk) and a white screen (a screen having an average luminance greater than or equal to the threshold value Wt (Bk<Wt)), and thereafter, calculates the sense luminance value of the target video by taking an average of the average luminance flameAverageluminance. Although the specific values of the threshold values Bk (first threshold value) and Wt (second threshold value) do not limit the present embodiment, the specific values may be set to, for example, Bk=50, Wt=2000, and the like.

(Active Image Area)

Hereinafter, the active image area appearing in the above description will be described in more detail.

When calculating a frame luminance value per frame, the calculation unit 23 preferably calculates the frame luminance value by excluding an area having luminance greater than or equal to a predetermined threshold value. Here, an image area excluding an area having the luminance greater than or equal to the predetermined threshold value is referred to as an active image area.

Processing of the calculation unit 23 in a case where a displayable maximum luminance of the display panel is 1000 nits and the predetermined threshold value is 200 nits will be described with reference to FIG. 8, as an example of the active image area.

Figure 8:
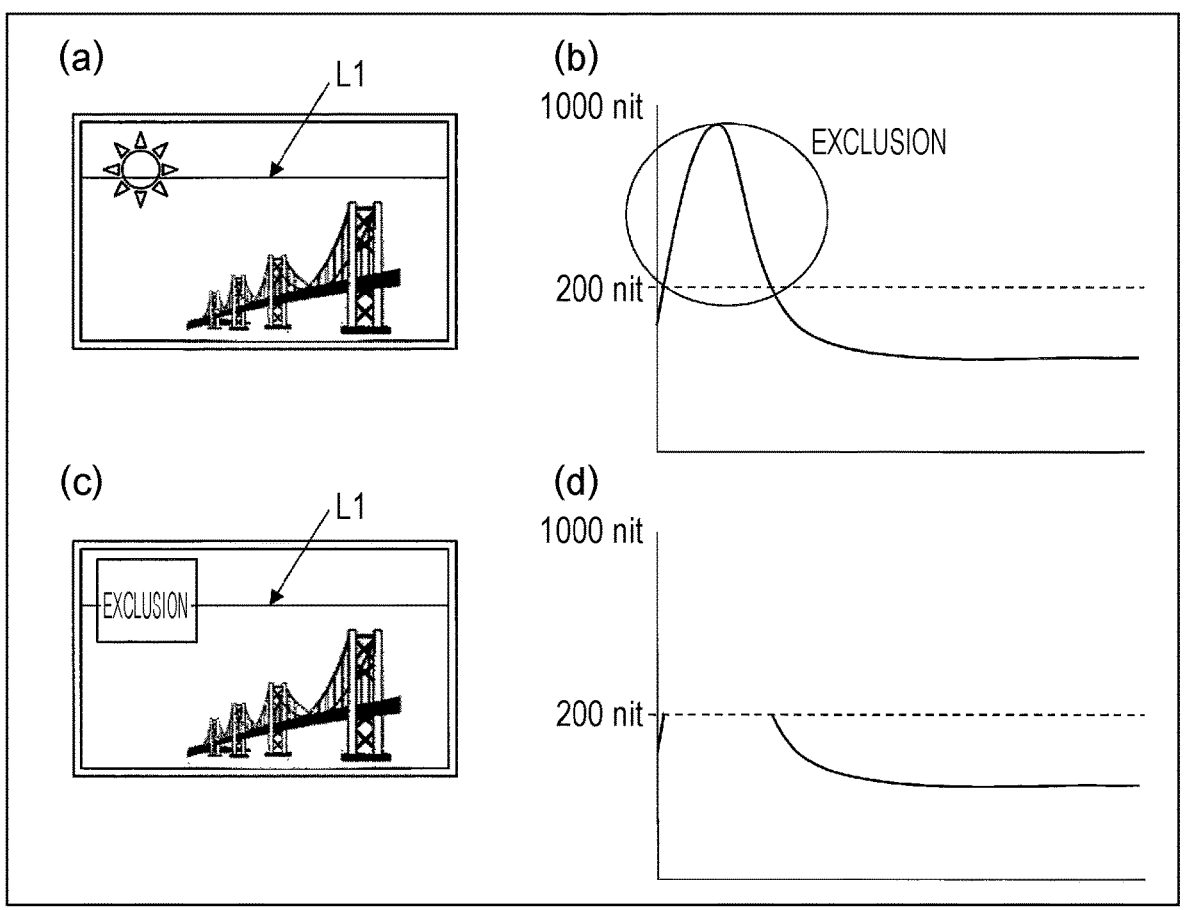
FIG. 8 is a diagram illustrating an example of a method of calculating the sense luminance value according to Embodiment 1 of the present invention, (a) and (b) of FIG. 8 are diagrams before a luminance value in a predetermined range is excluded, and (c) and (d) of FIG. 8 are diagrams after the luminance value in the predetermined range is excluded.

In the example illustrated in (a) and (b) of FIG. 8, there is luminance exceeding 200 nits at the luminance along a line L1. In a case of calculating an average of the luminance along the line L1 illustrated in (a) of FIG. 8, the calculation unit 23 calculates a frame luminance value without using a luminance value in the relevant area, for a high luminance area higher than or equal to 200 nits which is a predetermined luminance.

More specifically, as illustrated in (c) of FIG. 8, the calculation unit 23 regards an area having the luminance greater than or equal to a predetermined threshold as an exclusion area, and as illustrated in (d) of FIG. 8, the calculation unit 23 does not use the luminance included in the exclusion area for calculating the frame luminance value. In other words, the calculation unit 23 calculates the frame luminance value with reference to the luminance included in the area other than the exclusion area.

Embodiment 2

The display device 1 including the video processing device 20 according to Embodiment 2 will be described below with reference to FIG. 9. In the following description, description on the matters previously described in the above embodiment will be omitted, and points different from the above embodiment will be described.

The display device 1 according to the present embodiment includes a mute image generation unit 24a instead of the mute image generation unit 24 included in the display device 1.

Figure 9:
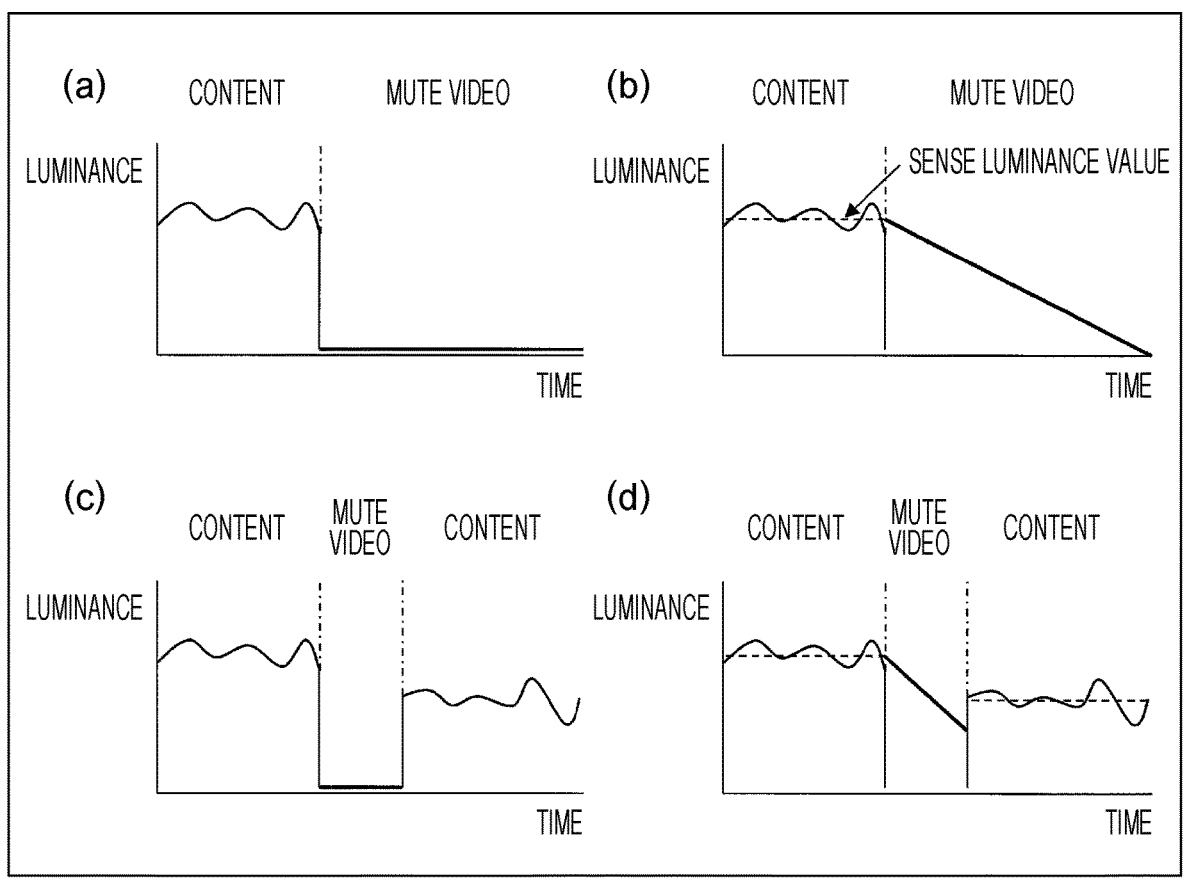
FIG. 9 is a graph illustrating a time-dependent change in luminance value of the display video, (a) and (b) of FIG. 9 illustrate the time-dependent change in luminance value in a case where there is no next content, and (c) and (d) of FIG. 9 illustrates the time-dependent change in luminance value in a case where there is the next content.

FIG. 9 illustrates a time-dependent change in luminance value of the display video. (a) and (c) of FIG. 9 illustrate the time-dependent change in luminance value of a video processing device in the related art, (a) of FIG. 9 illustrates a case where a display video is stopped, and (c) of FIG. 9 illustrates a case where a mute video is inserted between the respective contents. (b) and (d) of FIG. 9 illustrate the time-dependent change in luminance value of the video processing device 20 according to the present embodiment, (b) of FIG. 9 illustrates a case where the display video is stopped, and (d) of FIG. 9 illustrates a case where the mute video is inserted between the respective contents. As illustrated in (b) and (d) of FIG. 9, the video processing device 20 according to the present embodiment is configured to gradually lower a luminance value of the mute video.

Here, in the present specification, gradually reducing the luminance value includes
  reducing the luminance value step by step, and
  reducing the luminance value linearly or nonlinearly.

In addition, in the present embodiment, a rate of reducing the luminance value can be appropriately set according to a length of display time of the mute video, the luminance value to be reduced, and the like.

More specifically, the mute image generation unit 24a according to the present embodiment sets an initial value of luminance of the mute video such that a difference between
  (2-1) the luminance of the mute video and
  (2-2) the sense luminance value of the video data representing a display video (first display video) displayed prior to the mute video in time
is within a predetermined range, and sets the luminance value of the mute video so as to be decreased along time series from the initial value of the luminance of the mute video. As a result, in (b) and (d) of FIG. 9, the luminance value of the mute video is configured to gradually be reduced, and an abrupt variation of the luminance value is suppressed. Thereby, it is possible to reduce a psychological burden of a user due to the luminance difference.

A reduction rate reducing the luminance value is not limited to the present embodiment, and can be appropriately set.

Embodiment 3

A display device 1 including the video processing device 20 according to Embodiment 3 will be described below with reference to FIGS. 10 and 11. In the following description, description on the matters previously described in the above embodiments will be omitted, and points different from the above embodiment will be described.

The display device 1 according to the present embodiment includes a reception unit 11b, an acquisition unit 22b, and a mute video generation unit 24b instead of the reception unit 11, the acquisition unit 22, and the mute image generation unit 24 included in the display device 1.

In the present embodiment, in the transmitting device 30, meta information such as luminance information on each content is embedded in the video signal to be transmitted. More specifically, the luminance information on the content which is displayed later than a certain content is embedded in the meta information on the certain content by the transmitting device 30, in addition to the luminance information on the certain content. In other words, the luminance information on the current content and the luminance information on the next content are embedded in the meta information on the current content. The "current content" corresponds to a display video (first display video) displayed prior to the mute video in time, and the "next content" corresponds to the display video (second display video) displayed posterior to the mute video in time. A specific description on the transmitting device 30 will be given below.

The above-described luminance information includes an average luminance, the maximum luminance, a median value of luminance values, MaxFALL, and a sense luminance value of the entire next content calculated therefrom. In addition, a configuration may be further provided in which the above-described luminance information includes at least one of
  the sense luminance value of the entire current content,
  the sense luminance value within the last predetermined period of the current content, and
  the sense luminance value within a predetermined period at the head of next content.

Here, the "predetermined period" is not limited in particular and can be appropriately selected like, for example, one minute, two minutes, or three minutes. In addition, the predetermined period may be set according to the content included in the video signal.

The median value of luminance values may be any one of an average median value obtained by averaging the median value of luminance values per frame over a plurality of frames, and a median value of histogram over a plurality of frames, based on the average luminance value per frame.

The reception unit 11b receives the above-described video signal and outputs the video signal to the acquisition unit 22b.

Figure 10:
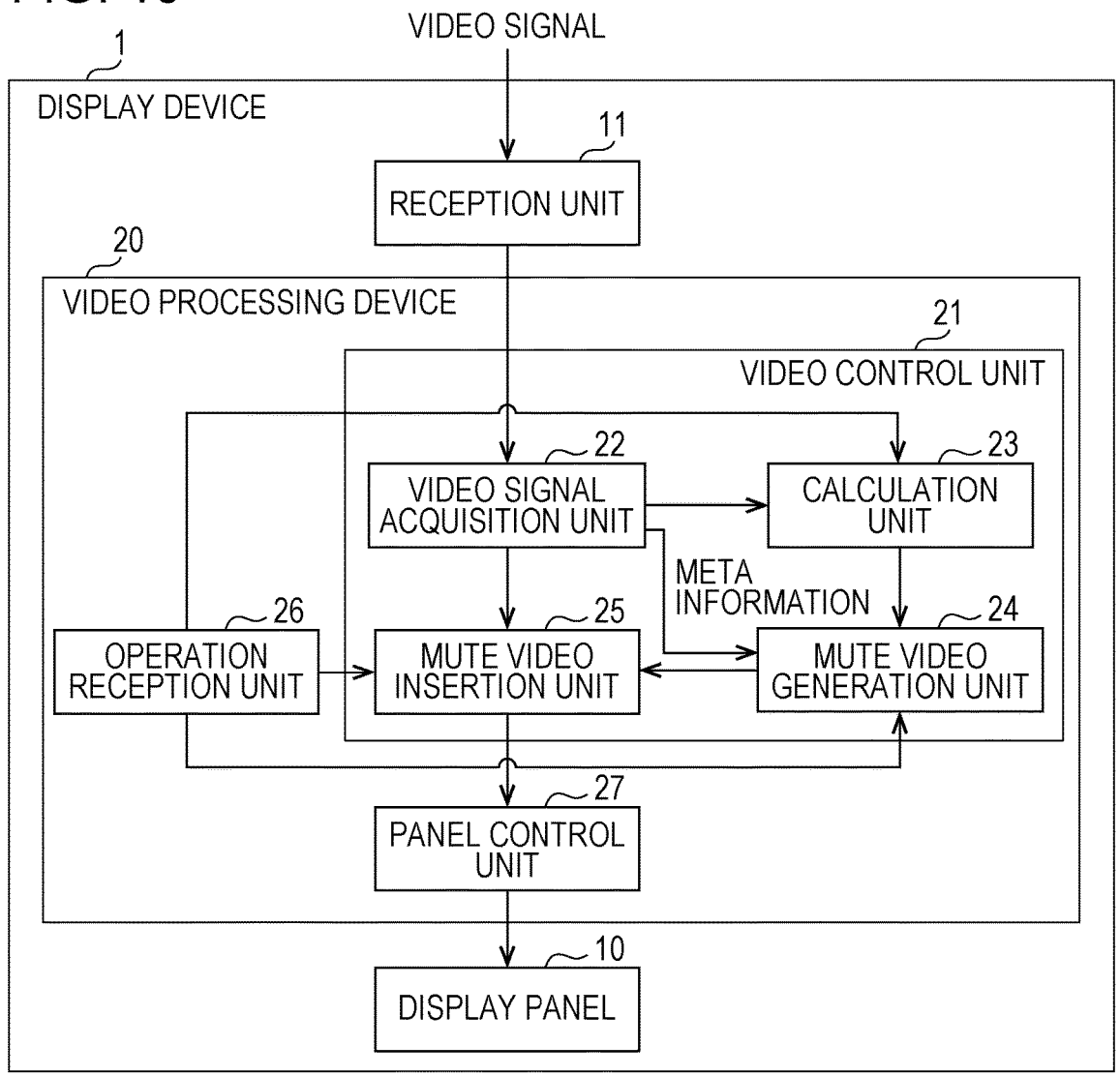
FIG. 10 is a block diagram illustrating a configuration of a display device including a video processing device according to Embodiments 3, 4, and 5 of the present invention.
Figure 11:
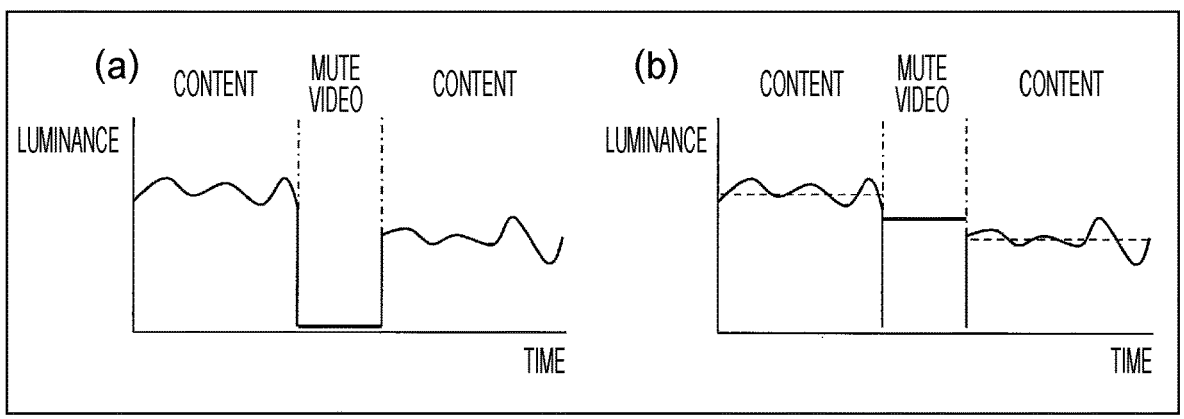
FIG. 11 is a graph illustrating the time-dependent change in luminance value of the display video, (a) of FIG. 11 illustrates the time-dependent change in luminance value of the display device in the related art, and (b) of FIG. 11 illustrates the time-dependent change in luminance value of the display device according to Embodiment 3 of the present invention.

As illustrated in FIG. 10, the acquisition unit 22b acquires the video signal from the reception unit 11, outputs video data of the current content to the mute video insertion unit 25 and the calculation unit 23, and outputs a video feature of the next content to the mute video generation unit 24b.

The mute video generation unit 24b according to the present embodiment generates a mute video which is set as a luminance value of the mute video so as to be a value corresponding to (3-1) a video feature of the current content input from the calculation unit 23, and (3-2) a video feature of the next content input from the acquisition unit 22.

In other words, the luminance value of the mute video is the luminance corresponding to the video feature relating to the first display video and the second display video. For example, the mute video generation unit 24b sets an average value of (3-1) and (3-2) as a luminance value of the mute video.

Here, the time-dependent change in luminance value of the display video of the video processing device 20 according to the present embodiment will be described with reference to FIG. 11. (a) of FIG. 11 illustrates the time-dependent change in luminance value of a video processing device in the related art, and (b) of FIG. 11 illustrates the time-dependent chance in luminance value of the video processing device 20 according to the present embodiment. As illustrated in (b) of FIG. 11, in the video processing device 20 according to the present embodiment, an average value of luminance values of the content prior to and posterior to the mute video is set to a luminance value of a mute video, and thereby, a difference in luminance value between the mute video and the mute video prior to and posterior to the mute video is reduced.

In this way, the video processing device 20 according to the present embodiment not only can reduce a difference in luminance value between a mute video and video data displayed prior to the mute video, but also can reduce a difference in luminance value between the mute video and the video data displayed posterior to the mute video. Thereby, it is possible to reduce a psychological burden of a user due to the luminance difference.

(Transmitting Device)

The transmitting device 30 according to the present embodiment will be described hereinafter with reference to FIG. 12. FIG. 12 is a block diagram illustrating a configuration of the transmitting device 30 according to the present embodiment. As illustrated in FIG. 12, the transmitting device 30 includes a meta information generation unit 31, an encoder 32, and a transmitting unit 33. For example, a camera 40 can be used as an external configuration of the transmitting device 30. The camera 40 captures a video and outputs a video signal of the captured video to the transmitting device 30. The transmitting device 30 acquires the input video signal using the meta information generation unit 31 and the encoder 32.

The meta information generation unit 31 generates meta information based on the acquired video signal and outputs the meta information to the transmitting unit 33.

The encoder 32 encodes the acquired video signal and generates video data. The encoder 32 outputs the generated video data to the transmitting unit 33. The transmitting unit 33 includes (3-3) the meta information input from the meta information generation unit 31, and (3-4) the video data input from the encoder 32 in the transmission video signal and transmits the transmission video signal.

The video signal may be transferred by a broadcast wave or may be transferred via a network such as the Internet. In addition, a configuration may be provided in which the meta information is transferred via a first transfer path, and the video data is transferred via a second transfer path. Here, the first transfer path may be used as a network such as the Internet, the second transfer path may be used as a broadcast wave, the first transfer path may be used as the broadcast wave, and the second transfer path may be used as the network such as the Internet. Alternatively, the transfer paths may be combined in other ways, and are not limited in particular.

An example of a transmission aspect of sense luminance information of the transmitting device 30 according to the present embodiment will be described hereinafter with reference to FIG. 13.

In the present example, the meta information generation unit 31 generates a video component descriptor Video_Component_Descriptor including the sense luminance information, and the transmitting unit 33 transmits Video_Component_Descriptor as, for example, a part of the video signal. Here, in a case where MMT is used as a multiplexing method of an advanced BS digital broadcast, the transmitting unit 33 includes Video_Component_Descriptor in an MMT Package Table (MPT) stored in a PA message of an MMT-SI message and transmits the MPT.

FIG. 13 is a diagram illustrating an example of Video_Component_Desciptor generated by the meta information generation unit 31.

As illustrated in FIG. 1. Video_Component_Desciptor generated by the meta information generation unit 31 includes a text character text_char. text_char generated by the meta information generation unit 31 includes at least one of present content having (A-1) a sense luminance value of the entire content, (A-2) a sense luminance value (for example: every ten minutes, per scene, one of total 10 divisions) for each time domain, (A-3) a sense luminance value of the first one minute of the content, and (A-4) a sense luminance value of the last one minute of the content, and at least one of next content having (B-1) a sense luminance value of the entire content, and (B-2) a sense luminance value of the first one minute of the content.

In addition, text_char generated by the meta information generation unit 31 may be configured to include a mute state flag for designating a way of setting luminance of the mute video. Here, the mute state flag is a flag for designating any one of (a) adjusting to the luminance of content before mute, (b) taking an average of the luminance of content before and after mute, and (c) changing along the time series from the luminance of content before mute to the luminance of content after mute as the luminance of the mute video. The mute state flag is referred to by the mute image generation unit 24 included in the video processing device 20, and the luminance of the mute video is set by using a method designated by the mute state flag.

Each information included in text_char of Video_Component_Desciptor is more specifically expressed by, for example, the following descriptor and a byte length. Here, (1-1') is a descriptor and a byte length for expressing the information illustrated in the above-described (A-1) (the same applies to other items).

About Present Content
(A-1') Total_CPL: 2 byte (0~65535 cd/m2)
(A-2') for (j=0;j<M;j++) {Scene_CPL[j]: 2 byte}
(A-3') Head_part_CPL: 2 byte
(A-4') Last_part_CPL: 2 byte
About Next Content
(B-1') Total NextCPL: 2 byte
(B-2') Head_part_NextCPL: 2 byte
As Mute State Flag
Mute_Video_Flag: 1 byte (1 or 2 or 3)

In (1 or 2 or 3) described in Mute_Video_Flag, 1, 2, and 3 correspond to (a), (b), and (c) described above, respectively.

Embodiment 4

The display device 1 including the video processing device 20 according to Embodiment 4 will be described hereinafter with reference to FIG. 14. In the following description, description on the matters previously described in the above embodiments will be omitted, and points different from the above-described embodiments will be described.

The display device 1 according to the present embodiment includes a mute video generation unit 24c instead of the mute video generation unit 24b included in the display device 1 according to Embodiment 3. The display device 1 according to the present embodiment receives the video signal described in Embodiment 3, and the video processing device 20 generates a mute video based on the video signal.

Figure 14:
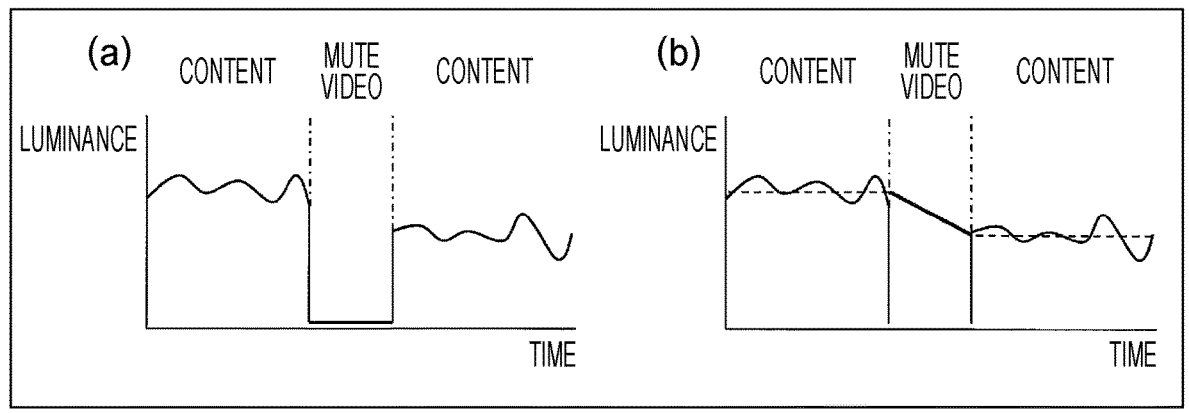
FIG. 14 is a graph illustrating the time-dependent change in luminance value of the display video, (a) of FIG. 14 illustrates the display device in the related art, and (b) of FIG. 14 illustrates the display device according to Embodiment 4 of the present invention.

FIG. 14 illustrates a time-dependent change in luminance value of a displayed video. (a) of FIG. 14 illustrates the time-dependent change in luminance value of the video processing device in the related art, and (b) of FIG. 14 illustrates the time-dependent change in luminance value of the video processing device 20 according to the present embodiment. As illustrated in (b) of FIG. 14, the video processing device 20 according to the present embodiment gradually changes a luminance value of a mute video from a luminance value of a display video (first display video) displayed prior to the mute video in time to a luminance value of a display video (second display video) displayed posterior to the mute video in time.

In the same manner as in Embodiment 3, a video feature of the current content is input from the calculation unit 23, and a video feature of the next content is input from the acquisition unit 22b to the mute video generation unit 24c according to the present embodiment. The mute video generation unit 24c sets a luminance value of a mute video so as to be changed from the video feature of the current content to the video feature of the next content along the time series, and generates the mute video.

As described above, the video processing device 20 according to the present embodiment gradually changes the luminance value of the mute video from the luminance value of the display video displayed prior to the mute video to the luminance value of the display video displayed posterior to the mute video, and suppresses an abrupt variation of the luminance value. Thereby, it IS possible to reduce a psychological burden of a user due to a luminance difference.

Embodiment 5

The display device 1 including the video processing device 20 according to Embodiment 5 will be described hereinafter with reference to FIG. 15. In the following description, description on the matters previously described in the above embodiments will be omitted, and points different from the above-described embodiments will be described.

The display device 1 according to the present embodiment includes a reception unit 11d, an acquisition unit 22d, a calculation unit 23d, and a mute video generation unit 24d instead of the reception unit 11b, the acquisition unit 22b, the calculation unit 23, and the mute video generation unit 24b included in the display device 1 according to Embodiment 3. The display device 1 according to the present embodiment receives the video signal described in Embodiment 3, and the video processing device 20 generates a mute video based on the video signal. The video signal according to the present embodiment includes a sense luminance value within the last predetermined period of the current content and a sense luminance value within the first predetermined period of the next content.

Figure 15:
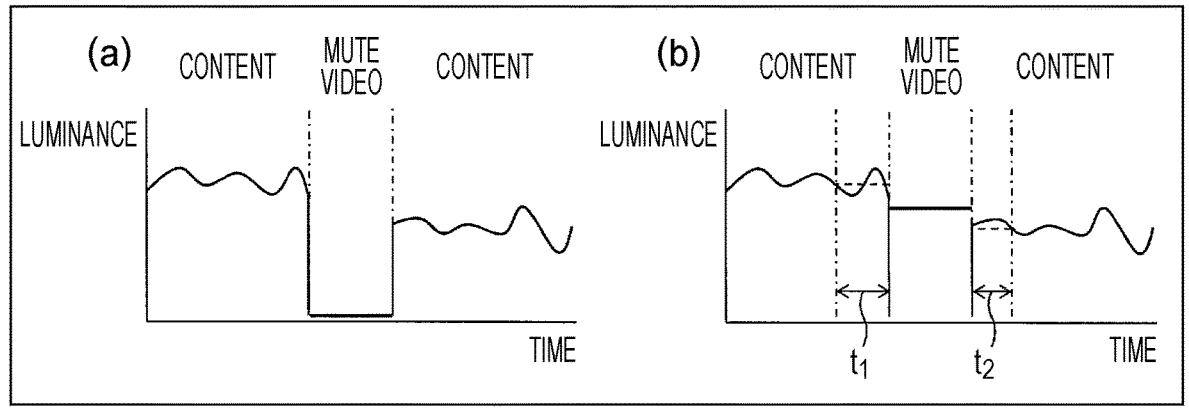
FIG. 15 is a graph illustrating the time-dependent change in luminance value of the display video, (a) of FIG. 15 illustrates the display device in the related art, and (b) of FIG. 15 illustrates the display device according to Embodiment 5 of the present invention.

FIG. 15 illustrates a time-dependent change in luminance value of a display video. (a) of FIG. 15 illustrates the time-dependent change in luminance value of the video processing device in the related art, and (b) of FIG. 15 illustrates the time-dependent change in luminance value of the video processing device 20 according to the present embodiment. As illustrated in (b) of FIG. 15, the video processing device 20 according to the present embodiment sets a luminance value of a mute video, based on a video feature within a predetermined period of the content prior to and posterior to the mute video. Here, $t_1$ indicates a predetermined period at the end of the content prior to the mute video, and $t_2$ indicates a predetermined period at the beginning of the content posterior to the mute video.

The calculation unit 23d according to the present embodiment calculates the video feature within a predetermined period of the display video prior to timing at which the mute video is displayed when calculating the video feature of the current content. The calculation unit 23d outputs the video feature to the mute video generation unit 24d. Here, more specifically, "prior to timing at which the mute video is displayed" is "immediately before the mute video". The "predetermined period" can be appropriately set like, for example, one second, three seconds, or 10 seconds. In addition, the predetermined period may be set according to the content included in the video signal.

The reception unit 11d outputs the video signal to the acquisition unit 22. The acquisition unit 22d acquires the video feature in the predetermined period of the next content as the video feature of the next content and outputs the video feature to the mute video generation unit 24d.

The mute video generation unit 24d sets a luminance value of the mute video so as to be a value corresponding to (5-1) the video feature within the predetermined period of the current content (first display video) input from the calculation unit 23d, and (5-2) the video feature within the predetermined period of the next content (second display video) input from the acquisition unit 22d.

Here, when the luminance value of the mute video is set, only the video feature of above (5-1) may be set instead of the video feature of the display video within the above-described predetermined period, and above (5-1) and (5-2) may be set instead of the video feature of the display video within the above-described predetermined period.

More specifically, the mute video generation unit 24d can set the luminance value of the mute video through the same processing as in Embodiment 1 to Embodiment 4 by using the video feature of the display video within the above-described predetermined period instead of the "video feature" described in Embodiments 1 to 4.

As such, since the video processing device 20 according to the present embodiment sets the luminance value of the mute video, based on the video feature in the vicinity of the mute video, it is possible to further reduce a difference in luminance value between the mute video and the video data displayed prior to and posterior to the mute video. Thereby, it is possible to reduce a psychological burden of a user due to a luminance difference.

Embodiment 6

The display device 1 including the video processing device 20 according to Embodiment 6 will be described hereinafter. In the following description, description on the matters previously described in the above embodiments will be omitted, and points different from the above-described embodiments will be described. The display device 1 according to the present embodiment includes a reception unit 11e, an acquisition unit 22e, and a mute video generation unit 24e instead of the reception unit 11d, the acquisition unit 22d, and the mute video generation unit 24d included in the display device 1 according to Embodiment 5. The display device 1 according to the present embodiment does not have a configuration corresponding to the calculation unit 23 described in the above embodiments.

The video processing device 20 according to the present embodiment receives the video signal described in Embodiment 5, and the video processing device 20 generates a mute video based on the video signal.

The reception unit 11e outputs the video signal to the acquisition unit 22e. The acquisition unit 22e outputs video data of the current content (first display video) to the mute video insertion unit 25, and outputs video features of the current content and the next content (second display video) to the mute video generation unit 24e.

More specifically, the mute video generation unit 24e can set a luminance value of the mute video through the same processing as in Embodiment 3 to Embodiment 5 by using the video feature of the display video within the above-described predetermined period, instead of the "video feature" described in Embodiment 1 to Embodiment 4.

As described above, the video processing device 20 according to the present embodiment can further reduce a difference in luminance value between the mute video and the video data displayed prior to and posterior to the mute video. In addition, since the calculation unit 23 described in the other embodiments is not provided, the video processing device 20 can be miniaturized.

Embodiment 7

Figure 16:
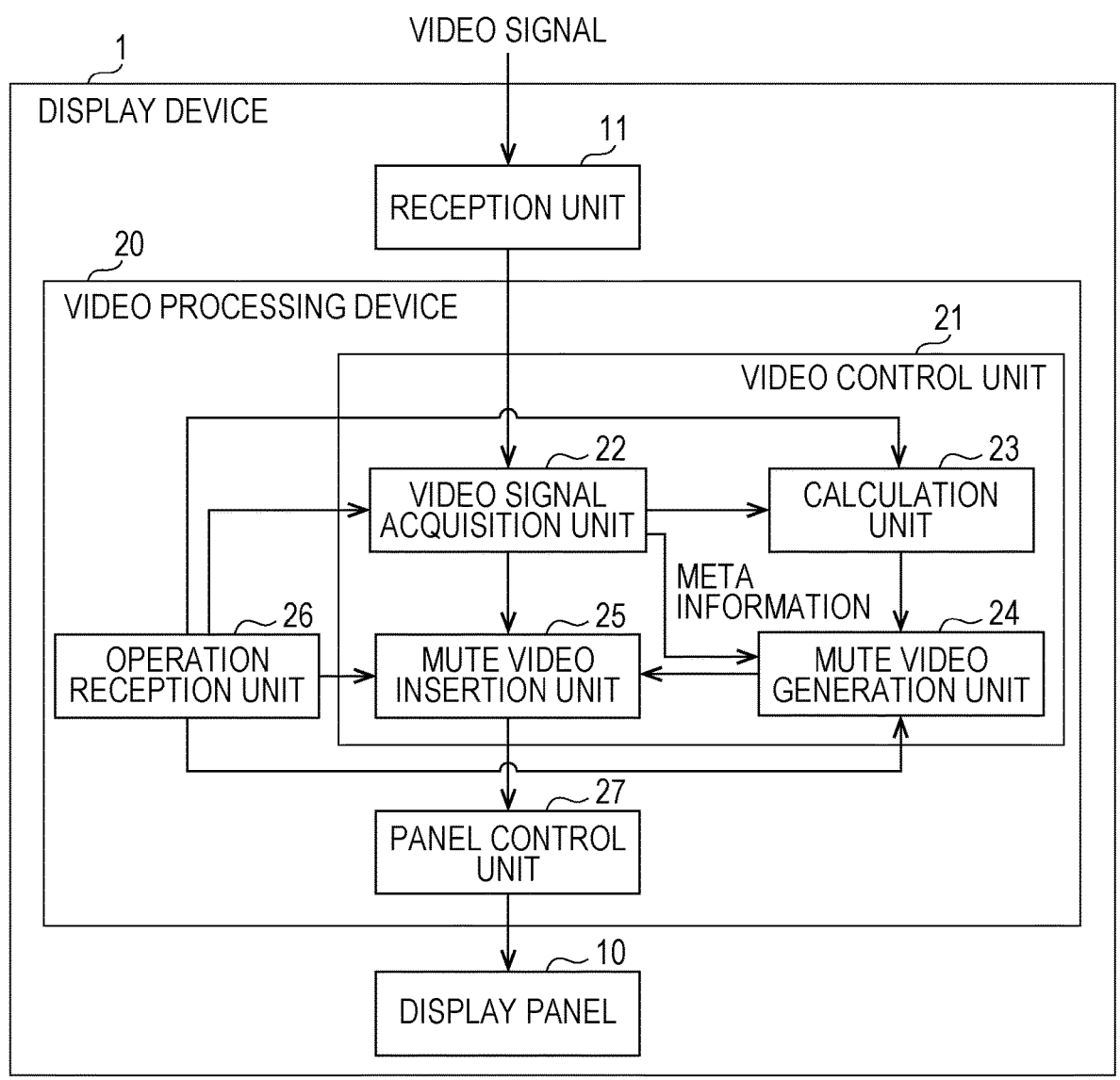
FIG. 16 is a block diagram illustrating a configuration of the display device including a video processing device according to Embodiment 7 of the present invention.

The display device 1 including a video processing device 20 according to Embodiment 7 will be described hereinafter with reference to FIG. 16. FIG. 16 is a block diagram illustrating a configuration of the video processing device 20 according to Embodiment 7. As illustrated in FIG. 16, the display device 1 according to Embodiment 7 includes a reception unit 11f, an acquisition unit 22f, a mute video generation unit 24f, and an operation reception unit 26f, instead of the reception unit 11e, the acquisition unit 22e, the mute video generation unit 24e, and the operation reception unit 26 included in the display device 1 according to Embodiment 6. In the following description, description on the matters previously described in the above embodiments will be omitted, and points different from the above-described embodiments will be described.

In the present embodiment, the transmitting device 30 transmits a video signal including the Event Information Table (EIT) to meta information on the video signal to the reception unit 11f. The EIT includes video features of one or a plurality of contents. A specific description on the transmitting device 30 will be given below.

The reception unit 11f outputs the received video signal to the acquisition unit 22f. In addition to the operation described in Embodiment 1, the operation reception unit 26f receives a channel switching operation. As illustrated in FIG. 16, the operation reception unit 26f outputs the switching operation to the acquisition unit 22f, the mute video generation unit 24f, and the mute video insertion unit 25.

The acquisition unit 22f acquires sense luminance values of one or a plurality of contents among video signals input from the reception unit 11f from an event information table which is meta information of the video signal. The acquisition unit 22f outputs the video feature of the content after switching to the mute video generation unit 24f, based on the video feature included in the EIT. Here, the "content after switching" is the content displayed after the switching operation is performed. The mute video generation unit 24f sets a luminance value of the mute video so as to be a value corresponding to (7-1) a video feature of the current content input from the calculation unit 23, and (7-2) a video feature of the content after switching input from the acquisition unit 22f, and generates the mute video. The mute video generation unit 24f outputs the mute video to the mute video insertion unit 25. The mute video generation unit 24f may be configured to receive the video feature of the current content from the acquisition unit 22f.

More specifically, the mute video generation unit 24f can set the luminance value of the mute video through the same processing as in Embodiment 3 to Embodiment 5, by using the video feature included in the EIT described above, instead of the "video feature" described in Embodiment 3 to Embodiment 5.

The display device 1 according to the present embodiment can insert a mute video at the time of channel switching through the above-described switching operation. Thereby, it is possible to set the luminance value of the mute video across a plurality of broadcast waves, and to display a display video into which the mute video is inserted.

(Transmitting Device)

An example of transmission processing of sense luminance information of the transmitting device 30 will be described with reference to FIG. 17. In the present example, the meta information generation unit 31 generates the EIT including the sense luminance information, and the transmitting unit 33 transmits the EIT as, for example, a part of the video signal. Here, the EIT is an example of Program Specific Information/Service Information (PSI/SI) included in Transport Stream (TS) in a current terrestrial digital broadcast, and is a data group in which information on content of the content is described. In a next generation ultrahigh definition television broadcast, an EIT called MPEG-H Event Information Table (MH-EIT) is used. It is assumed that the term "EIT" in the present specification includes both "EIT of current broadcast" and "MH-EIT".

(a) of FIG. 17 is a diagram illustrating an example of the EIT generated by the meta information generation unit 31. A descriptor D1 in the EIT illustrated in (a) of FIG. 17 includes sense luminance information for each content.

(b) of FIG. 17 is a diagram illustrating another example of the descriptor D1 including the sense luminance information in the EIT illustrated in (a) of FIG. 17. In the example illustrated (b) of FIG. 17, "0x4E" indicating that it is an extension type event descriptor is described as a value of descriptor_tag in the descriptor D1. In the extension type event descriptor, detailed information on the content is described as a text. Accordingly, as illustrated in (b) of FIG. 17, a text indicating the sense luminance information for each content may be configured to be described in Text_char in the descriptor D1. In the example illustrated in (b) of FIG. 17, a text "sense luminance 200 nits" indicating the sense luminance information is described, and the mute video generation unit 24 included in the display device 1 acquires the sensed luminance information by analyzing the text. If a configuration is provided in which a text described in Text_char is described with a predetermined hash tag such as "#", it is possible to make easy determination whether or not the text is a text indicating the sense luminance information.

In addition, the meta information generation unit 31 may be configured to include at least one of
(1) sense luminance values of the entire content,
(2) sense luminance values for each time domain (for example, every ten minutes, per scene, one in total ten divisions),
(3) a sense luminance value of the first one minute of the content, and
(4) a sense luminance value of the last one minute of the content
of the respective contents in Text_char in the descriptor D1 as more detailed sense luminance information.

(c) of FIG. 17 is a diagram illustrating an example of the electronic program guide (EPG) generated by the video processing device 20 that receives the EIT. As illustrated in (c) of FIG. 17, in the electronic program guide generated by the video processing device 20, cells indicating the respective contents are arranged on a two-dimensional plane defined by an axis indicating a channel of the content and an axis indicating time. As illustrated in (c) of FIG. 17, if an operation of focusing on any one of the cells of the electronic program table is performed, information on the content corresponding to the cells is displayed in a close-up manner. The information on the content includes, for example, sense luminance information of each content in addition to a program name, a broadcast time, a performer, a text indicating the content of the content, and the like. More specifically, as illustrated in (c) of FIG. 17, "sense luminance 200 nits" which is a text indicating the sense luminance information of the "sense luminance" is further presented as illustrated in E1 of (c) of FIG. 17, in addition to the program name, the broadcast time, the performer, and the text indicating the content of the content as information on each content.

Embodiment 8

The display device 1 including the video processing device 20 according to Embodiment 8 will be described hereinafter. In the following description, description on the matters previously described in the above embodiments will be omitted, and points different from the above embodiments will be described.

The display device 1 according to the present embodiment includes a calculation unit 23g and a mute video generation unit 24g instead of the calculation unit 23 and the mute video generation unit 24 included in the display device 1.

The calculation unit 23g calculates sense chromaticity values of each content included in video data with reference to at least one of several pieces of color gamut information such as an average chromaticity, a maximum chromaticity, a median value of the chromaticity values, and the like of the video data input from the acquisition unit 22. The color gamut information may be configured to be embedded in Video_Component_Desciptor or the EIT described in the above embodiments, in addition to the luminance information.

The calculation unit 23g outputs the calculated sense chromaticity value to the mute video generation unit 24g. The mute video generation unit 24g sets the chromaticity value of the mute video so as to be a value corresponding to the sense chromaticity value which is input and generates a mute video having the chromaticity value.

A color gamut based on ITU-R BT. 2020 or ITU-R BT. 709 may be used as the color gamut set by the mute video generation unit 24g.

As such, the present embodiment can set the chromaticity of the mute video instead of the luminance value of the mute video in the above embodiments and can generate the mute video.

Figure 18:
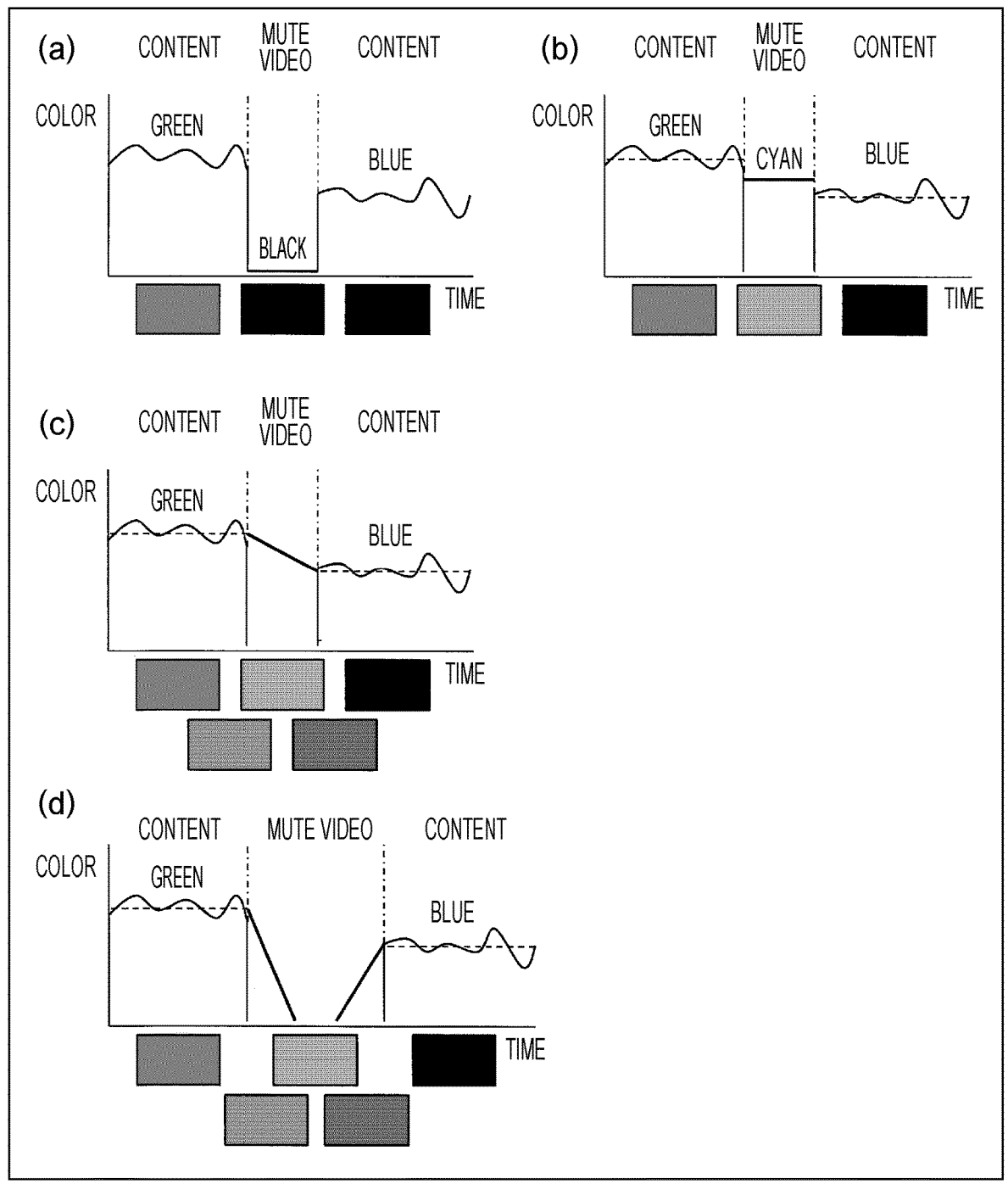
FIG. 18 is a graph illustrating time-dependent change in color of the display video, (a) of FIG. 18 is a graph illustrating the time-dependent change in chromaticity of a video processing device in the related art, and (b), (c), and (d) of FIG. 18 are graphs illustrating an example of the time-dependent change in chromaticity of the video processing device according to the present embodiment.

FIG. 18 illustrates a time-dependent change in chromaticity value of a display video. (a) of FIG. 18 illustrates the time-dependent change in chromaticity value of a video processing device in the related art, and (b), (c), and (d) of FIG. 18 illustrate an example of the time-dependent change in chromaticity value of the video processing device 20 according to the present embodiment. FIG. 18 illustrates the time-dependent change when a color of the current content is set to green and a color of the next content is set to blue, as an example of the time-dependent change in the chromaticity value.

In the video processing device in the related art, values of the chromaticity and luminance are 0, and thereby, a color of the mute video becomes black as illustrated in (a) of FIG. 18. In addition, a difference in chromaticity value between the mute video and the contents prior to and posterior to the mute video is increased.

As illustrated in (b) of FIG. 18, the color of the mute video is set to cyan in an example of the video processing device 20 according to the present embodiment. That is, in the present example, the chromaticity value of the mute video is set as an average value of the chromaticity values of the content prior to and posterior to the mute video. Thereby, it is possible to reduce the difference in chromaticity value between the mute video and the content prior to and posterior to the mute video.

As illustrated in (c) of FIG. 18, in the example of the video processing device 20 according to the present embodiment, the color of the mute video is gradually changed from green to blue. In other words, in the present example, the chromaticity value of the mute video is gradually changed from the chromaticity value of the display video (first display video) displayed prior to the mute video to the chromaticity value of the display video (second display video) displayed posterior to the mute video. Thereby, it is possible to suppress an abrupt variation in chromaticity value.

As illustrated in (d) of FIG. 18, in the example of the video processing device 20 according to the present embodiment, the color of the mute video is gradually changed from green to gray, and thereafter, is gradually changed from gray to blue. That is, in the present example, the chromaticity value of the mute video is gradually changed from the chromaticity value of the display video displayed prior to the mute video to zero, and thereafter, is gradually changed from zero to the chromaticity value of the display video displayed posterior to the mute video. Thereby, it is possible to reduce influence of the color of the content prior to and posterior to the mute video when an abrupt variation in chromaticity value is suppressed.

As such, the video processing device 20 according to the present embodiment can reduce a psychological burden of a user due to the chromaticity difference.

[Implementation Example by Software]

Control blocks (particularly, the acquisition unit 22, the calculation unit 23, the mute video generation unit 24, and the mute video insertion unit 25) of the video processing device 20 may be realized by a logic circuit (hardware) formed in an integrated circuit (IC chip) and the like, or may be realized by software using a Central Processing Unit (CPU).

In the latter case, the video processing device 20 includes the CPU that executes instructions of a program which is software for realizing each function, a Read Only Memory (ROM) in which the program and various data are recorded so as to be capable of being read by a computer (or the CPU) or a storage device (this is referred to as a "recording medium"), a random access memory (RAM) that develops the program, and the like. Then, the object of the present invention is achieved by the computer (or the CPU) reading the program from the recording medium and executing the program. A "non-transitory tangible medium", for example, a tape, a disk, a card, a semiconductor memory, a programmable logic circuit, or the like can be used as the recording medium. In addition, the program may be supplied to the computer via a certain transmission medium (a communication network, a broadcast wave, or the like) capable of transmitting the program. One aspect of the present invention can also be realized in the form of a data signal which is obtained by embodying the program through an electronic transfer and is embedded in a carrier wave.

When the display device 1 according to the above embodiment generates a mute video, which of the mute video generation processing according to the above embodiment is performed can be appropriately selected as a user performs an input to the operation reception unit 26.

[Appendix]

In the present specification, "calculation" includes derivation, arithmetic, computing, guidance, and the like.

In addition, in the present specification, "generation" includes making, producing, making-out, creating, creation, and the like.

In addition, in the present specification, "insertion" includes introduction, pinching, plug-in, incorporation, and the like.

In addition, "sense luminance value" in the present specification includes visual luminance, visually corrected luminance, sensibility luminance, sensory luminance, and the like.

[Summarization]

The video display device 1 according to Aspect 1 of the present invention includes a calculation unit 23 that calculates video feature relating to a display video, and a mute video display unit that displays a mute video posterior to a first display video, and luminance of the mute video is luminance corresponding to a value of the video feature relating to the first display video.

According to the above configuration, a luminance value of a mute video is set to a value within a predetermined range with respect to a sense luminance value of video data displayed prior to a mute video in time, and thus, it is possible to reduce a difference in luminance value between a mute video and video data displayed prior to the mute video.

In the video display device 1 according to Aspect 2 of the present invention, is the Aspect 1, the mute video display unit displays the mute video prior to the second display video, the video display device includes as acquisition unit 22 that acquires a video feature relating to the second display video from meta information relating to the display video, and the luminance of the mute video is luminance corresponding to values of the video features relating to the first display video and the second display video.

According to the above configuration, it is possible not only to reduce a difference in luminance value between a mute video and video data displayed prior to the mute video, but also to reduce a difference in luminance value between the mute video and video data displayed posterior to the mute video.

In the video display device 3 according to Aspect 3 of the present invention, in the Aspect 1 or 2, the calculation unit 23 calculates a video feature within a predetermined period of the display video, and the luminance of the mute video is luminance corresponding to the value of the video feature within the predetermined period of the first display video and the value of the video feature within the predetermined period of the second display video.

According to the above configuration, since a luminance value of a mute video can be set based on a sense luminance value in the vicinity of the mute video, it is possible to reduce a difference in luminance value between the mute video and video data displayed prior to and posterior to the mute video.

In the video display device 1 according to Aspect 4 of the present invention, in any one aspect of the Aspects 1 to 3, the video feature is a sense luminance value.

The video display device 1 according to Aspect 5 of the present invention, in the Aspect 4, the calculation unit 23 calculates the sense luminance value with reference to at least one of an average luminance, a maximum luminance, a median value of the luminance value, and MaxFALL of the display video.

In the video display device 1 according to Aspect 6 of the present invention, in the Aspect 4 or 5, the calculation unit 23 calculates the sense luminance value by excluding at least one of a screen having an average luminance less than or equal to a first threshold value and a screen having an average luminance greater than or equal to a second threshold value, among the display videos, the first threshold value is a threshold value of a black screen, and the second threshold value is a threshold value of a white screen.

The video display device 1 according to Aspect 7 of the present invention includes an acquisition unit 22 that acquires video features of one or a plurality of contents from meta information on a display video, and a mute video display unit that displays a mute video posterior to a first display video and prior to a second display video, and luminance of the mute video is luminance corresponding to a value of a video feature relating to the first display video and a value of a video feature relating to the second display video.

According to the configuration, it is possible to further reduce a difference in luminance value between a mute video and video data displayed prior to and posterior to the mute video. In addition, it is possible to miniaturize the video display device 1 without including the calculation unit 23.

In the video display device 1 according to Aspect 8 of the present invention, in the Aspect 7, the acquisition unit 22 acquires a video feature within a predetermined period of the first display video and a video feature within a predetermined period of the second display video, and the luminance of the mute video is luminance corresponding to a value of a video feature within a predetermined period of the first display video and a value of a video feature within a predetermined period of the second display video.

According to the above configuration, a luminance value of a mute video can be set based on a video feature in the vicinity of the mute video, and thus, it is possible to reduce a difference in luminance value between the mute video and video data displayed prior to and posterior to the mute video.

In the video display device 1 according to Aspect 9 of the present invention, in the Aspect 7 or 8, the acquisition unit 22 acquires video features of one or a plurality of contents from a video component descriptor that is included in an MMT package table which is meta information on the display video.

In the video display device 1 according to Aspect 10 of the present invention, in the Aspect 7 or 8, the acquisition unit 22 acquires video features of one or a plurality of contents from an event information table that is meta information on the display video.

A television receiver according to Aspect 11 of the present invention includes the video display device 1 according to any one aspect of the Aspects 1 to 10. Therefore, the same action effect as the action effect of the video display device 1 according to the Aspects 1 to 10 are obtained.

The transmitting device 30 according to Aspect 12 of the present invention includes a transmitting unit that transmits video data of one or a plurality of contents and sense luminance information indicating sense luminance values of the one or the plurality of contents.

The transmitting unit 33 may transmit the sensory luminance information by including it in the video component descriptor included in the MMT package table or may include it in the event information table.

According to the above configuration, the transmitting device 30 transmits a video signal in which a sense luminance value is embedded, and thus, it is possible to simplify processing of the display device 1.

In addition, the video display device 1 according to Aspect 1 to Aspect 10 of the present invention may be realized by a computer, and in this case, by operating the computer as each unit (software element) included in the video display device 1, a control program of the video display device 1 that causes the video display device 1 to be realized by the computer, and a computer readable recording medium in which the control program is recorded are also within the scope of the present invention.

In the video display device 1 according to Aspect 17 of the present invention, the luminance of the mute video displayed posterior to a first display video is a value corresponding to a video feature relating to the first display video.

According to the above configuration, luminance value of a mute video is set to a value within a predetermined range with respect to a sense luminance value of video data displayed prior to the mute video in time, and thus, it is possible to reduce a difference in luminance value between the mute video and video data displayed prior to the mute video.

In the video display device 1 according to Aspect 18 of the present invention, in the Aspect 17, the mute video is displayed prior to a second display video, and the luminance of the mute video is luminance corresponding to a value of a video feature of the first display video and a value of a video feature of the second display video acquired from meta information on the display video.

According to the above configuration, it is possible not only to reduce a difference in luminance value between a mute video and video data displayed prior to the mute video, but also to reduce a difference in a luminance value between the mute video and video data displayed posterior to the mute video.

In Aspect 17 or 18, the video display device 1 according to Aspect 19 of the present invention calculates a video feature within a predetermined period of the display video, and the luminance of the mute video is luminance corresponding to a value of a video feature within the predetermined period of the first display video and a value of a video feature within the predetermined period of the second display video.

According co the above configuration, a luminance value of a mute video can be set based on a sense luminance value in the vicinity of the mute video, and thus, it is possible to reduce a difference in luminance value between the mute video and video data displayed prior to and posterior to the mute video.

In the video display device 1 according to Aspect 20 of the present invention, in any one of Aspect 17 to Aspect 19, the video feature is a sense luminance value.

In the video display device 1 according to Aspect 21 of the present invention, in Aspect 20, the sense luminance value is calculated with reference to at least one of an average luminance, a maximum luminance, a median value of the luminance value, and MaxFALL of the display video.

In Aspect 20 or 21, the video display device 1 according to Aspect 22 of the present invention calculates the sense luminance value by excluding at least one of a screen having an average luminance less than or equal to a first threshold value and a screen having an average luminance greater than or equal to a second threshold value among the display videos.

In the video display device 1 according to Aspect 23 of the present invention, the luminance of the mute video displayed posterior to the first display video and prior to the second display video is luminance corresponding to values of video features of the display video and the second display video acquired from meta information on the display videos.

According to the above configuration, it is possible to further reduce a difference in luminance value between a mute video and video data displayed prior to and posterior to the mute video.

In the Aspect 23. The video display device 1 according to Aspect 24 of the present invention acquires a video feature within a predetermined period of the first display video and a video feature within a predetermined period of the second display video, and the luminance of the mute video is luminance corresponding to a value of the video feature within the predetermined period of the first display video and a value of the video feature within the predetermined period of the second display video.

In the Aspect 23 or 24, the video display device 1 according to Aspect 25 of the present invention acquires video features of one or a plurality of contents from a video component descriptor included in an MMT package table which is meta information on the display video.

In the Aspect 23 or 24, the video display device 1 according to Aspect 26 of the present invention acquires video features of one or a plurality of contents from an event information table which is meta information on the display video.

A television receiver according to Aspect 27 of the present invention includes the video display device 1 according to any one aspect from the Aspect 17 to Aspect 26. Therefore, the same action effect as the action effect of the video display device 1 of the Aspects 17 to Aspect 26 are obtained.

The transmitting device 30 according to Aspect 28 of the present invention transmits video data of one or a plurality of contents and sense luminance information indicating sense luminance values of the one or the plurality of contents.

In addition, the transmitting device 30 may transmit the sense luminance information by including the sense luminance information in a video component descriptor included in an MMT package table, and may transmit the sense luminance information by including the sensory luminance information in an event information table.

According to the above configuration, the transmitting device 30 transmits a video signal in which a sense luminance value is embedded, and thus, it is possible to simplify processing of the display device 1.

In addition, the video display device 1 according to Aspect 17 to Aspect 26 of the present invention may be realized by a computer. In this case, by operating the computer as each unit (software element) included in the video display device 1, a control program of the video display device 1 that causes the video display device 1 to be realized by the computer, and a computer readable recording medium in which the control program is recorded are also within the scope of the present invention.

The present invention is not limited to the above-described embodiments, and various modifications can be made within the scope described in the claims, and embodiments obtained by appropriately combining technical means respectively disclosed in different embodiments are also included in the technical scope of the present invention. Furthermore, new technical features can be formed by combining technical means respectively disclosed in each embodiment.

REFERENCE SIGNS LIST

1 DISPLAY DEVICE (VIDEO DISPLAY DEVICE)
10 DISPLAY PANEL
11 RECEPTION UNIT
21 VIDEO CONTROL UNIT
22 VIDEO SIGNAL ACQUISITION UNIT (ACQUISITION UNIT)
23 CALCULATION UNIT
24 MUTE VIDEO GENERATION UNIT
25 MUTE VIDEO INSERTION UNIT
26 OPERATION RECEPTION UNIT
27 PANEL CONTROL UNIT
30 TRANSMITTING DEVICE
31 META INFORMATION GENERATION UNIT
32 ENCODER
33 TRANSMITTING UNIT
40 CAMERA

The invention claimed is:

1. A video display device comprising:
a calculation unit that calculates video feature relating to a display video; and
a mute video display unit that displays a mute video posterior to a first display video,
wherein luminance of the mute video is luminance corresponding to a value of the video feature relating to the first display video,
wherein the mute video display unit displays the mute video prior to a second display video,
wherein the video display device includes an acquisition unit that acquires a video feature relating to the second display video from meta information relating to the display video, and
wherein the luminance of the mute video is luminance corresponding to values of the video features relating to the first display video and the second display video.

2. The video display device according to claim 1,
wherein the calculation unit calculates a video feature within a predetermined period of the display video, and
wherein the luminance of the mute video is luminance corresponding to the value of the video feature within the predetermined period of the first display video and the value of the video feature within the predetermined period of the second display video.

3. The video display device according to claim 1,
wherein the video feature is a sense luminance value.

4. The video display device according to claim 3,
wherein the calculation unit calculates the sense luminance value with reference to at least one of an average luminance, a maximum luminance, a median value of the luminance value, and MaxFALL of the display video.

5. The video display device according to claim 1,
wherein the calculation unit calculates the sense luminance value by excluding at least one of a screen having an average luminance less than or equal to a first threshold value and a screen having an average luminance greater than or equal to a second threshold value, among the display videos.

6. A television receiver comprising:
the video display device according to claim 1.

7. A non-transitory computer readable recording medium comprising:
the control program that causes a computer to function as the video display device according to claim 1.

8. A video display device comprising:
an acquisition unit that acquires video features of one or a plurality of contents from meta information on a display video; and
a mute video display unit that displays a mute video posterior to a first display video and prior to a second display video,
wherein luminance of the mute video is luminance corresponding to a value of a video feature relating to the first display video and a value of a video feature relating to the second display video.

9. The video display device according to claim 8,
wherein the acquisition unit acquires a video feature within a predetermined period of the first display video and a video feature within a predetermined period of the second display video, and
wherein the luminance of the mute video is luminance corresponding to a value of a video feature within a predetermined period of the first display video and a value of a video feature within a predetermined period of the second display video.

10. The video display device according to claim 8,
wherein the acquisition unit acquires video features of one or a plurality of contents from a video component descriptor that is included in an MMT package table which is meta information on the display video.

11. The video display device according to claim 8,
wherein the acquisition unit acquires video features of one or a plurality of contents from an event information table that is meta information on the display video.

12. A non-transitory computer readable recording medium comprising:
the control program that causes a computer to function as the video display device according to claim 8.

13. A television receiver comprising:
the video display device according to claim 8.

14. A method of displaying a video, comprising:
a calculation step that calculates video feature relating to a display video; and
a mute video display step of displaying a mute video posterior to a first display video,
wherein luminance of the mute video is luminance corresponding to a value of the video feature relating to the first display video,
wherein the mute video display step displays the mute video prior to a second display video,
wherein the method of displaying the video includes an acquisition step of acquiring a video feature relating to the second display video from meta information relating to the display video, and
wherein the luminance of the mute video is luminance corresponding to values of the video features relating to the first display video and the second display video.

15. A method of displaying a video, comprising:
an acquisition step of acquiring video features of one or a plurality of contents from meta information on a display video; and
a mute video display step of displaying a mute video posterior to a first display video and prior to a second display video,
wherein luminance of the mute video is luminance corresponding to a value of a video feature relating to the first display video and a value of a video feature relating to the second display video.

\* \* \* \* \*